(12) United States Patent
Anegawa et al.

(10) Patent No.: US 11,426,933 B2
(45) Date of Patent: Aug. 30, 2022

(54) MOLTEN MATERIAL SUPPLYING APPARATUS, THREE-DIMENSIONAL MODELING APPARATUS, AND METHOD FOR PRODUCING COMPOSITE MATERIAL

(71) Applicant: Seiko Epson Corporation, Tokyo (JP)

(72) Inventors: Kenta Anegawa, Matsumoto (JP); Yasuto Kanai, Matsumoto (JP); Kei Yokota, Matsumoto (JP); Koichi Saito, Matsumoto (JP)

(73) Assignee: Seiko Epson Corporation

( * ) Notice: Subject to any disclaimer, the term of this patent is extended or adjusted under 35 U.S.C. 154(b) by 698 days.

(21) Appl. No.: 16/204,551

(22) Filed: Nov. 29, 2018

(65) Prior Publication Data
US 2019/0160746 A1 May 30, 2019

(30) Foreign Application Priority Data
Nov. 30, 2017 (JP) .............................. JP2017-229773

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/106* (2017.08); *B29C 64/118* (2017.08); *B29C 64/165* (2017.08); *B33Y 10/00* (2014.12); *B33Y 30/00* (2014.12); *B33Y 70/00* (2014.12); *B29K 2101/12* (2013.01); *B29K 2307/04* (2013.01)

(58) Field of Classification Search
None
See application file for complete search history.

(56) References Cited

U.S. PATENT DOCUMENTS 6,146,575 A * 11/2000 Huston ................... F04C 2/025
264/349
2006/0158456 A1 * 7/2006 Zinniel ................. B29C 64/188
345/589

(Continued)

FOREIGN PATENT DOCUMENTS

JP 2012-131115 A * 7/2012
JP 2016-060204 A 4/2016
(Continued)

*Primary Examiner* — Mohammad M Ameen
(74) *Attorney, Agent, or Firm* — Harness, Dickey & Pierce, P.L.C.

(57) ABSTRACT

A molten material supplying apparatus includes: a first introduction unit introducing fiber material; a melting unit melting a thermoplastic resin into a molten material; a first flow path in which the molten material and the fiber material are distributed; and a nozzle communicating with the first flow path to feed a composite of the molten material and the fiber material. The melting unit includes: a facing section in which a communication hole communicating with the first flow path is formed, the facing section having a heater, and a flat screw which has a groove at a position facing the facing section, the flat screw being rotated to melt the thermoplastic resin into the molten material and supply the molten material into the communication hole. The first introduction unit introduces the fiber material into at least one of the communication hole and the first flow path.

12 Claims, 7 Drawing Sheets

(51) Int. Cl.
  *B29C 64/165*  (2017.01)
  *B33Y 30/00*   (2015.01)
  *B33Y 70/00*   (2020.01)
  *B33Y 10/00*   (2015.01)
  *B29C 64/106*  (2017.01)
  *B29K 307/04*   (2006.01)
  *B29K 101/12*   (2006.01)

(56) References Cited

U.S. PATENT DOCUMENTS

| | | |
|---|---|---|
| 2016/0082659 A1 | 3/2016 | Hickman et al. |
| 2017/0157851 A1* | 6/2017 | Nardiello .............. B29C 48/266 |
| 2017/0210069 A1 | 7/2017 | Stubenruss |
| 2017/0210074 A1 | 7/2017 | Ueda et al. |
| 2017/0361497 A1 | 12/2017 | Crescenti Savall et al. |
| 2020/0061906 A1 | 2/2020 | Nakai et al. |
| 2021/0060851 A1* | 3/2021 | Nakai .................... B29C 70/38 |

FOREIGN PATENT DOCUMENTS

| | | |
|---|---|---|
| JP | 2017-128073 A | 7/2017 |
| JP | 2017-523934 A | 8/2017 |
| JP | 2017-537826 A | 12/2017 |
| WO | WO-2015-182675 A1 | 12/2015 |

* cited by examiner

MOLTEN MATERIAL SUPPLYING APPARATUS, THREE-DIMENSIONAL MODELING APPARATUS, AND METHOD FOR PRODUCING COMPOSITE MATERIAL

This application claims priority under 35 U.S.C. § 119 to Japanese Patent Application No. 2017-229773 filed on Nov. 30, 2017, the entire disclosure of which is expressly incorporated by reference herein.

BACKGROUND

1. Technical Field

The present invention relates to a molten material supplying apparatus, a three-dimensional modeling apparatus and a method for producing a composite material.

2. Related Art

There have been known three-dimensional modeling apparatuses that feed a molten resin material, and deposit and solidify the resin material to produce a three-dimensional model. According to a modeling process by a three-dimensional modeling apparatus disclosed in WO 2015/182675, a composite material made of a filament-shaped thermoplastic resin material and a fiber material wound around the outer surface thereof is used. The composite material, in which the fiber material is contained in the resin material melted by heat, is fed from a nozzle. Since a three-dimensional model is produced by solidifying the resin material containing the fiber material, the three-dimensional model has improved strength.

In the modeling process by the above three-dimensional modeling apparatus, melting of the resin material by a heating apparatus is performed after the resin material is combined with a fiber material. Accordingly, the composite material often has the fiber material appearing on the surface of the resin material. When produced by the composite material with a fiber material appearing on the surface of the resin material, a three-dimensional model has disadvantages such as inferior outer appearance or surface nature compared with those produced without using such a composite material. Therefore, in the three-dimensional modeling apparatus, there is still a demand for improvement in supply of a composite material with a reduced amount of fiber material appearing on the surface of the resin material.

SUMMARY

An advantage of some aspects of the invention is provided as the aspects or applied examples described below.

(1) According to an aspect of the present disclosure, a molten material supplying apparatus for use in the three-dimensional modeling apparatus is provided. The molten material supplying apparatus includes: a first introduction unit that introduces a fiber material; a melting unit that melts a thermoplastic resin into a molten material; a first flow path in which the molten material and the fiber material are distributed; and a nozzle that communicates with the first flow path to feed the molten material and the fiber material. The melting unit includes: a facing section in which a communication hole communicating with the first flow path is formed, the facing section having a heater; and a flat screw which has a groove section at a position facing the facing section, the flat screw being rotated to melt the thermoplastic resin into the molten material and supply the molten material into the communication hole. The first introduction unit introduces the fiber material into at least one of the communication hole and the first flow path. In this case, the fiber material is introduced into at least one of the communication hole and the first flow path. That is, the fiber material can be introduced into the resin material which has been melted by the melting unit. Accordingly, the composite material having a reduced amount of fiber materials appearing on the surface of the resin material, compared with the case where the composite material is supplied by applying a heating processing after the fiber material and the resin material which is not melted are combined to each other.

(2) In the molten material supplying apparatus of the above aspect, it is also possible that: the first introduction unit is provided in the groove section; the flat screw includes a through hole that communicates with the first introduction unit; and the fiber material is introduced from the first introduction unit into the groove section via the through hole of the flat screw. In this case, the fiber material can be introduced into the groove section via the through hole of the flat screw and introduced into the communication hole via the groove section. Accordingly, the fiber material can be introduced from the upstream position relative to the first flow path. Therefore, the position of the fiber material contained in the resin material can be prevented from being deviated from the center axis of the flow path in which the molten material is distributed.

(3) In the molten material supplying apparatus of the above aspect, it is also possible that the first introduction unit is connected to one of both ends of the groove section, which is opposite to an end connected to the communication hole, so as to allow the fiber material to be introduced into the groove section. In this case, the fiber material can be introduced into the communication hole via the groove section of the flat screw. Accordingly, the fiber material can be introduced from the upstream position relative to the first flow path. Therefore, the position of the fiber material contained in the resin material can be prevented from being deviated from the center axis of the flow path in which the molten material is distributed.

(4) In the molten material supplying apparatus of the above aspect, it is also possible that the first introduction unit is connected to the first flow path. In this case, the fiber material can be introduced from the first flow path. The flow rate of the molten material is higher at the center in the first flow path compared to the position outside the center axis. Accordingly, the composite material with the fiber material contained in the resin material being disposed adjacent to the center of the resin material can be provided by drawing the fiber material into the center of the flow where the flow rate is high.

(5) In the molten material supplying apparatus of the above aspect, it is also possible that a length of the first flow path from a position where the first introduction unit is connected to the first flow path up to the communication hole is smaller than a length of the first flow path from the position where the first introduction unit is connected to the first flow path up to an opening of the nozzle. In this case, the fiber material can be introduced from the first flow path at a position close to the communication hole (that is, the upstream side). Therefore, compared with the case where the fiber material is introduced from the position close to the nozzle (that is, the downstream side) of the first flow path, the fiber material can be mixed with the molten material by allowing the fiber material to follow a flow of the molten material in the first flow path.

(6) The molten material supplying apparatus of the above aspect may further include a second introduction unit that introduces a fiber material. The first introduction unit is configured to introduce the fiber material in either rightward or leftward direction with respect to the direction which is directed from the first introduction unit to the center axis of the first flow path when the direction of the flow path of the first flow path is oriented parallel to a downward direction in a gravitational direction. The second introduction unit is configured to introduce the fiber material in either rightward or leftward direction with respect to the direction which is directed from the second introduction unit to the center axis when the direction of the flow path of the first flow path is oriented parallel to a downward direction in a gravitational direction. In this case, a plurality of fiber materials can be introduced from different positions into the first flow path. Further, the fiber materials can be introduced in one of the right and left directions, and the introduction directions of the fiber materials at the respective positions where the fiber materials are introduced may be identical. Accordingly, the fiber material can be disposed to surround the center axis of the resin material. Therefore, compared to the case where a plurality of fiber materials are not contained, a composite material having improved strength can be provided.

The molten material supplying apparatus of the above aspect may further include a second introduction unit that introduces a fiber material. The first introduction unit is configured to introduce the fiber material in a direction forming an angle larger than 0 with respect to the direction directing to the center axis of the first flow path. The second introduction unit is configured to introduce the fiber material in a direction forming the above angle with respect to the direction directing to the center axis of the first flow path. In this case, a plurality of fiber materials can be introduced from different positions into the first flow path. Further, the fiber materials can be introduced in directions forming an angle larger than 0 with respect to the direction directing to the center axis of the first flow path at the respective positions where the fiber material is introduced, and the introduction directions of the fiber materials may be identical. Accordingly, the fiber material can be disposed to surround the center axis of the resin material. Therefore, compared to the case where a plurality of fiber materials are not contained, a composite material having improved strength can be provided.

(7) In the molten material supplying apparatus of the above aspect, it is also possible that an area of the outer shape of the first introduction unit at a position where the first introduction unit and the first flow path is connected to each other, which is an area A1, is smaller than an area of the outer shape of the first flow path in a direction perpendicular to a flow path of the molten material, which is an area A2. In this case, the molten material can be prevented from flowing back from the first flow path into the introduction unit.

(8) According to another aspect of the present disclosure, a three-dimensional modeling apparatus is provided. The three-dimensional modeling apparatus includes: the molten material supplying apparatus according to the above aspect; a support section that receives the molten material and the fiber material fed out from the molten material supplying apparatus, and a movement mechanism that changes a relative position between the molten material supplying apparatus and the support section.

(9) According to another aspect of the present disclosure, a method for producing a composite material for a three-dimensional model is provided. The method for producing a composite material for a three-dimensional model includes the steps of: providing a facing section which includes a communication hole and a heater, the communication hole communicating with a first flow path in which a material is distributed, and a flat screw which has a groove section at a position facing the facing section, the flat screw being rotated to melt the thermoplastic resin into the molten material and supply the molten material into the communication hole; supplying the thermoplastic resin into the groove section; rotating the flat screw and generating heat by the heater to melt the thermoplastic resin supplied into the groove section to thereby form the molten material; distributing the molten material into the first flow path; and forming a composite material by introducing a fiber material into the molten material distributed in the first flow path. The step of forming a composite material includes introducing a fiber material from at least one of the communication hole and the first flow path. According to the method for producing a composite material for a three-dimensional model, the composite material having a reduced amount of fiber materials appearing on the surface of the resin material, compared with the case where the composite material is supplied by applying a heating processing after the fiber material and the resin material which is not melted are combined to each other.

(10) In the method for producing a composite material for a three-dimensional model according to the above aspect, it is also possible that the step of introducing a fiber material includes the steps of: introducing a fiber material into the first flow path from a first introduction unit; and introducing a fiber material into the first flow path from a second introduction unit. It is also possible that the step of introducing the fiber material from the first introduction unit is a step of introducing the fiber material in either rightward or leftward direction with respect to a direction which is directed from the first introduction unit to the center axis of the first flow path when the direction of the flow path of the first flow path is oriented parallel to a downward direction in a gravitational direction, and the step of introducing the fiber material from the second introduction unit is a step of introducing the fiber material in either rightward or leftward direction with respect to a direction which is directed from the second introduction unit to the center axis of the first flow path when the direction of the flow path of the first flow path is oriented parallel to a downward direction in a gravitational direction. In this case, a plurality of fiber materials can be introduced from different positions into the first flow path. Further, the fiber materials can be introduced in the right direction, which is one of the right and left directions, and the introduction directions of the fiber materials may be identical. Accordingly, the fiber material can be disposed to surround the center axis of the resin material. Therefore, compared to the case where a plurality of fiber materials are not contained, a composite material having improved strength can be provided.

A plurality of elements of the aspects of the invention described above are not necessarily essential. In order to solve part or all of the above problems, or to achieve part or all of the effects described herein, part of the plurality of elements can be altered, eliminated, or replaced with other new elements, or the limitations on the plurality of elements can be partially deleted as appropriate. Further, in order to solve part or all of the above problems, or to achieve part or all of the effects described herein, part or all of the technical features included in an aspect of the invention can be combined with part or all of the technical features included in another aspect of the invention to thereby provide an independent aspect of the invention.

The invention can be implemented in various forms other than a molten material supplying apparatus and a three-dimensional modeling apparatus. For example, the invention can be implemented as a method for feeding a molten material, a method for producing a three-dimensional model using a molten material, and the like. In addition, the invention can also be implemented as a method for controlling a three-dimensional modeling apparatus, a computer program for implementing various methods described above, and a non-transitory recording medium in which the computer program is recorded.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
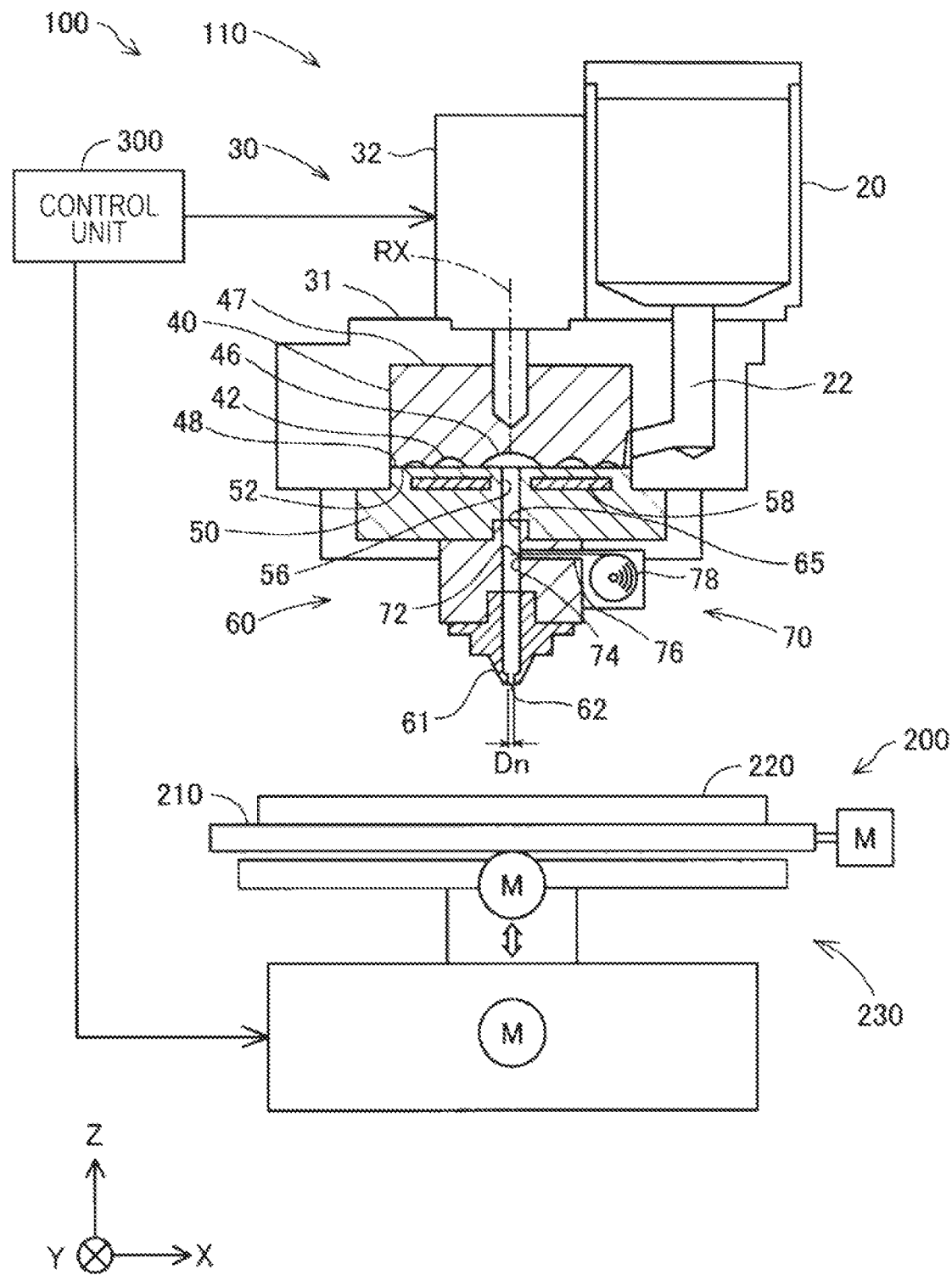
FIG. 1 is a schematic view of a configuration of a three-dimensional modeling apparatus of a first embodiment.

FIG. 1 is a schematic view of a configuration of a three-dimensional modeling apparatus 100 of a first embodiment. In FIG. 1, three directions X, Y, and Z which are perpendicular to each other are indicated by the arrows. The X direction and the Y direction are directions parallel to the horizontal plane, and the Z direction is a direction opposite to the gravitational direction. In other drawings, the arrows which indicate X, Y, and Z directions are also illustrated as necessary corresponding to FIG. 1.

The three-dimensional modeling apparatus 100 includes a molten material supplying apparatus 110, a modeling stage section 200, and a control unit 300. The three-dimensional modeling apparatus 100 is configured to feed a molten material from the nozzle 61 of the molten material supplying apparatus 110 onto a modeling base 220 of the modeling stage section 200 under control of the control unit 300 to produce a three-dimensional model.

The molten material supplying apparatus 110 includes a material supply unit 20, a melting unit 30, a feeding unit 60, and a fiber supplying unit 70. The material supply unit 20 is composed of a hopper such that a discharge port located in a lower part of the hopper is connected to the melting unit 30 via a communication path 22. A thermoplastic resin material in the form of solid material such as pellets or powder is loaded into the material supply unit 20. Further, a pigment, metal, ceramic, or the like may be added to the thermoplastic resin material to be loaded into the material supply unit 20. The material supply unit 20 supplies the thermoplastic material into the melting unit 30.

The melting unit 30 melts the material supplied from the material supply unit 20 and allows the molten material to flow into the feeding unit 60. The melting unit includes a screw casing 31, a drive motor 32, a flat screw 40, and a facing section 50.

The flat screw 40 is a substantially columnar shaped screw having a height in the axial direction (direction along the center axis) smaller than the diameter, and has groove sections 42 formed on an undersurface 48, which is a surface perpendicular to a rotation axis RX. The above communication path 22 of the material supply unit 20 is connected to the groove sections 42 through a side surface of the flat screw 40. The specific shape of the flat screw 40 is described later.

The flat screw 40 is positioned with the axial direction being parallel to the Z direction, and rotates in the circumferential direction. In FIG. 1, the rotation axis RX of the flat screw 40 is indicated by the dot and dashed line. In the first embodiment, the center axis of the flat screw 40 corresponds to the rotation axis RX of the flat screw 40.

The flat screw 40 is housed in the screw casing 31. A top 47 of the flat screw 40 is connected to the drive motor 32. A rotation driving force generated by the drive motor 32 causes the flat screw 40 to rotate in the screw casing 31. The drive motor 32 is driven under control of the control unit 300.

The undersurface 48 of the flat screw 40 faces a top 52 of the facing section 50. A space is formed between the groove sections 42 of the undersurface 48 and the top 52 of the facing section 50. In the molten material supplying apparatus 110, the thermoplastic material supplied from the material supply unit 20 is distributed through this space. The groove sections 42 are rotated by the rotation of the flat screw 40 to feed the material into a communication hole 56, which is described later, while melting the material so that the molten material is supplied into the communication hole 56.

The facing section 50 is a member in a substantially columnar shape having the height in the axial direction (direction along the center axis) smaller than the diameter. A circular surface on one side of the facing section 50 faces the undersurface 48 of the flat screw 40, and a circular surface on the other side of the facing section 50 is connected to the feeding unit 60. In the facing section 50, a heater 58 for heating the material is incorporated.

The material supplied into the groove section 42 flows along the groove section 42 by rotation of the flat screw 40, while being melted by heat generated by the heater 58 and converted into a molten material, and is guided into a center portion 46 of the flat screw 40, which is described later. The molten material which has flowed into the center portion 46 is supplied to the feeding unit 60 via the communication hole 56 formed at the center of the facing section 50.

The feeding unit 60 is connected to the melting unit 30 and is configured to supply the molten material. The feeding unit 60 allows the molten material supplied from the facing section 50 to be distributed in the flow path and fed out through the nozzle 61. The feeding unit 60 includes the nozzle 61 and a first flow path 65.

The nozzle 61 has a mechanism for feeding a composite material from a feeding port 62 at the tip. The feeding port 62 is an opening formed at the nozzle 61 with a hole diameter Dn, and is connected to the communication hole 56 via the first flow path 65.

The first flow path 65 is a space provided in the feeding unit 60, and is a flow path for a molten material between the communication hole 56 and the feeding port 62. In the first embodiment, the first flow path 65 is formed in a straight shape in the gravitational direction. The first flow path 65 has a circular cross-sectional shape with a diameter Wd in a direction perpendicular to a distribution direction of the molten material in the first flow path 65. The molten material which has been molten in the melting unit 30 flows from the communication hole 56 to the nozzle 61 via the first flow path 65.

The fiber supplying unit 70 has a mechanism for supplying a fiber material into the flow path of the molten material. The fiber supplying unit 70 includes a first introduction unit 74, an introduction path 76, and a fiber winding section 78. The fiber winding section 78 is a roll around which the fiber 72 is wound in a cylindrical shape.

The fiber 72 is a bundle of the fiber material having a substantially circular cross-section. In the first embodiment, the fiber 72 is a bundle-shaped fiber material composed of a plurality of carbon fibers each having a 10 μm diameter, bundled by a sizing agent. As a material for the fiber 72, various materials such as carbon fiber and glass fiber, which have an elastic modulus higher than that of the resin material may be used.

The first introduction unit 74 is an opening for introducing the fiber 72 into the flow path for the molten material. In the first embodiment, the first introduction unit 74 is provided on the inner wall of the first flow path 65. The introduction path 76 is a space having a substantially cylindrical shape extending in a direction substantially vertical to the direction of a flow path of the first flow path 65. The introduction path 76 is connected to the first introduction unit 74 such that a space in which the fiber winding section 78 is provided is connected to the first flow path 65. That is, the introduction path 76 is a path for the fiber 72 that allows the fiber 72 to be introduced from the fiber winding section 78 into the first flow path 65.

The fiber 72 is fed out by rotation of the roll-shaped fiber winding section 78, and introduced from the first introduction unit 74 into the first flow path 65 via the introduction path 76. The fiber 72 introduced into the first flow path 65 is distributed in the first flow path 65 along a flow of the molten material distributed in the first flow path 65. That is, as the fiber 72 introduced into the molten material distributed in the first flow path 65, a composite material of the molten material and the fiber 72 is formed. The composite material formed in the first flow path 65 is distributed in the first flow path 65, and fed out through the feeding port 62 of the nozzle 61 onto the modeling base 220 of the modeling stage section 200. The details of the fiber supplying unit 70 is described later.

The modeling stage section 200 is a stage on which a three-dimensional model is produced and has a mechanism for moving in three axis directions. The modeling stage section 200 is disposed at a position facing the nozzle 61 of the feeding unit 60. The modeling stage section 200 includes a table 210, the modeling base 220 disposed on the table 210, and a movement mechanism 230 that moves the modeling stage 220. The modeling base 220 is a support section for supporting the molten material and the fiber 72 fed out from the molten material supplying apparatus 110. The movement mechanism 230 includes three motors, which are indicated by "M" in FIG. 1. The movement mechanism 230 is composed of a three-axis positioner that moves the modeling stage 220 in three axis directions of X, Y, and Z directions by a driving force of three motors. The modeling stage section 200 changes the relative position between the nozzle of the molten material supplying apparatus 110 and the modeling base 220 by the movement mechanism 230 under control of the control unit 300.

The control unit 300 can be implemented by, for example, a computer including a processor such as a CPU, a main memory, and a non-volatile memory. The non-volatile memory in the control unit 300 stores a computer program for controlling the three-dimensional modeling apparatus 100. The control unit 300 performs modeling process by driving the molten material supplying apparatus 110 to feed a molten material onto the modeling base 220 at a coordinate position in accordance with the modeling data to produce a three-dimensional object three-dimensional object.

Figure 2:
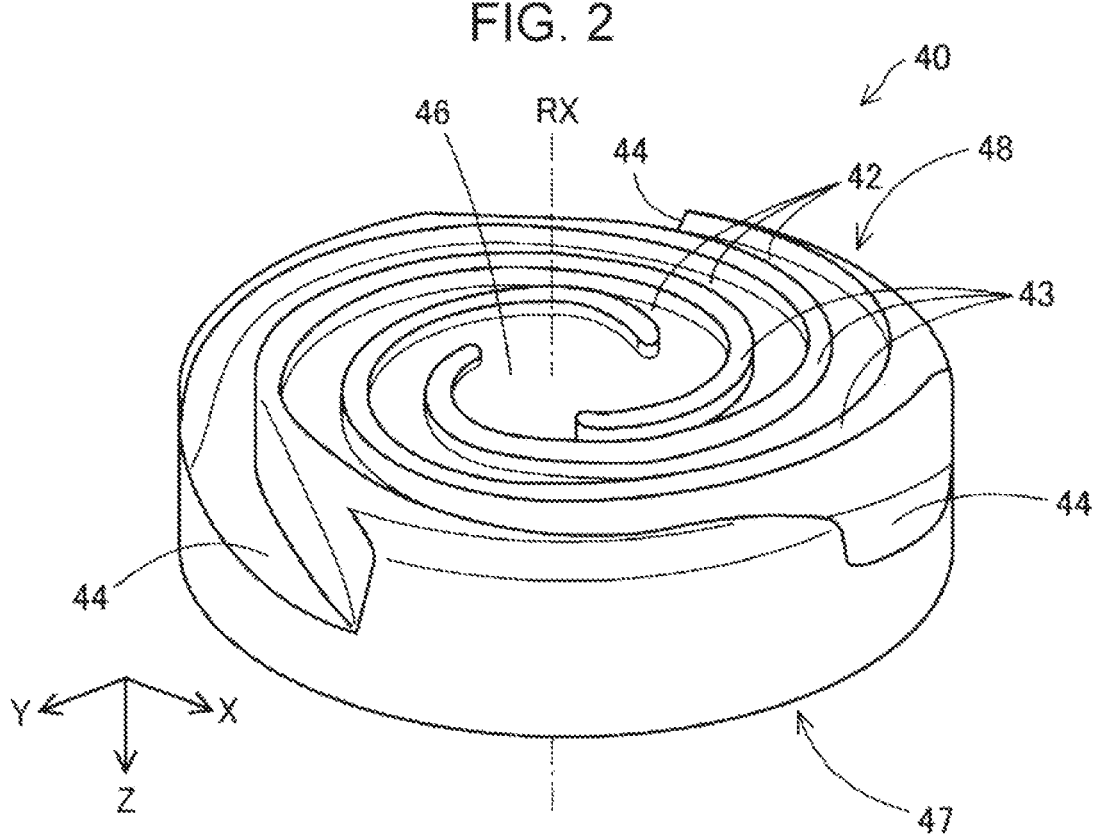
FIG. 2 is a schematic perspective view which illustrates a configuration of an undersurface of a flat screw.

FIG. 2 is a schematic perspective view which illustrates a configuration of the undersurface 48 of the flat screw 40. In FIG. 2, the position of the rotation axis RX of the flat screw 40 rotating in the melting unit 30 is indicated by the dot and dashed line. As described above, the groove sections 42 are disposed on the undersurface 48 of the flat screw 40 which faces the facing section 50 (FIG. 1). Hereinafter, the undersurface 48 is referred to as a "groove forming surface 48".

The center section 46 of the groove forming surface 48 of the flat screw 40 is a recess formed at one end of the groove section 42. The center section 46 faces the communication hole 56 (FIG. 1) of the facing section 50. In the first embodiment, the center section 46 intersects with the rotation axis RX.

The groove sections 42 of the flat screw 40 extend in an arc from the center section 46 to the outer periphery of the flat screw 40 in a volute shape. The groove sections 42 may also be formed in a spiral shape. FIG. 2 illustrates an example of the flat screw 40 which includes three ridges that constitute side walls of three groove sections 42 and extend along the respective groove sections 42.

The groove section 42 continuously extends to a material inlet port 44 formed on the side surface of the flat screw 40. The material inlet port 44 is a portion that receives a material supplied through the communication path 22 of the material supply section 20.

Figure 3:
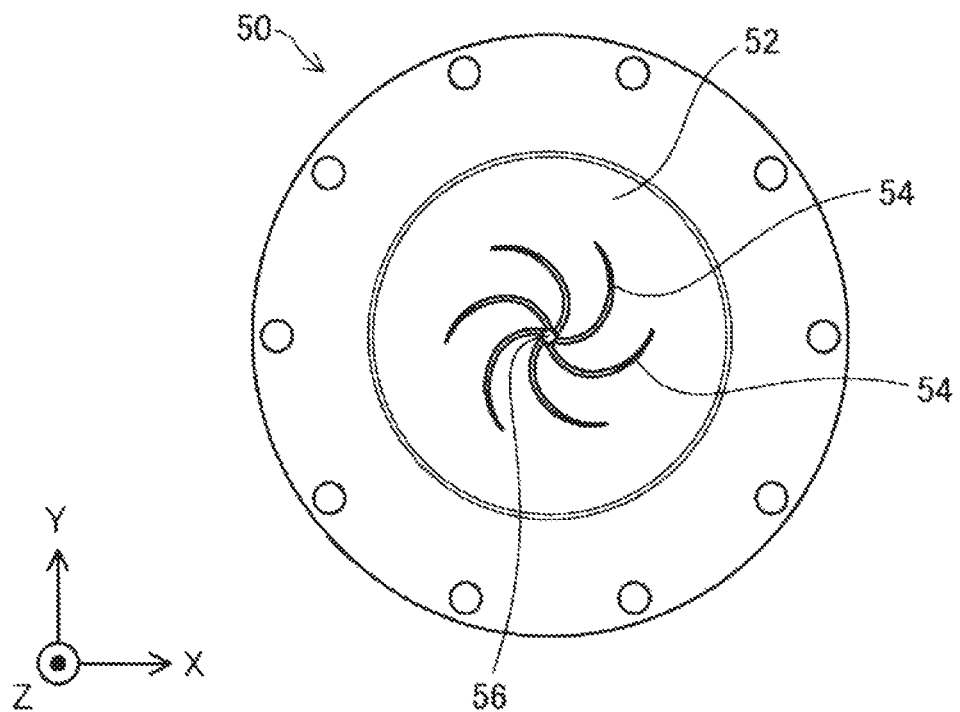
FIG. 3 is a schematic plan view which illustrates a top of a facing section.

FIG. 3 is a schematic plan view which illustrates the top 52 of the facing section 50. As described above, the top 52 of the facing section 50 faces the groove forming surface 48 of the flat screw 40. Hereinafter, the top 52 is referred to as a "screw facing surface 52". The communication hole 56 described above is formed at the center of the screw facing surface 52 so as to supply a molten material therethrough to the first flow path 65.

The screw facing surface 52 has a plurality of guide grooves 54 that are connected to the communication hole 56 and extend from the communication hole 56 to the outer periphery in a volute shape. The plurality of guide grooves 54 has a function of guiding a molten material to the communication hole 56. As described above, the heater for heating the material is incorporated in the facing section 50 (see FIG. 1). Melting of the material in the melting unit 30 is performed by heating by the heater 58 of the facing section 50 and rotation of the flat screw 40. As described above, according to the three-dimensional modeling apparatus 100 of the first embodiment, downsizing of the apparatus and improvement in modeling precision can be achieved by use of the flat screw 40.

Figure 4:
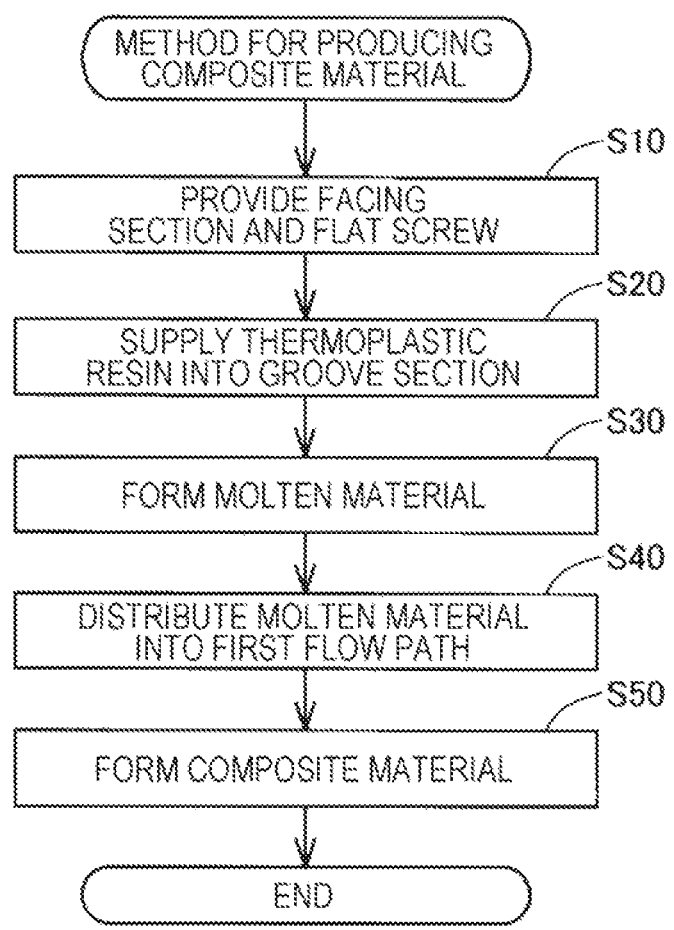
FIG. 4 is a diagram which explains a method for producing a composite material, which is performed by a molten material supplying apparatus included in the three-dimensional modeling apparatus.

FIG. 4 is a diagram which explains a method for producing a composite material, which is performed by the molten material supplying apparatus 110 included in the three-dimensional modeling apparatus 100. In the following description, with reference to FIG. 4 as well as FIGS. 1 to 3, a method for producing a composite material performed by the molten material supplying apparatus 110 will be described.

In Step S10, the facing section 50 and the flat screw 40 are provided. As described above, the facing section 50 is a member in a substantially columnar shape and has the communication hole 56 communicating with the first flow path 65. The facing section 50 also has the heater 58. The flat screw 40 is a screw in a substantially columnar shape, and is disposed in the screw casing 31 at a position facing the facing section 50 (see FIG. 1). The flat screw is rotated by the drive motor 32 to distribute the material into the space formed between the groove sections 42 of the groove forming surface 48 and the top 52 of the facing section 50.

In Step S20, a thermoplastic resin material is supplied into the groove sections 42 of the flat screw 40. Examples of the thermoplastic material include polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), poly ether ketone (PEEK), and polycarbonate (PC). A thermoplastic resin material in the form of solid material such as pellets or powder is loaded into the material supply unit 20, and supplied from the material inlet ports 44 into the groove sections 42 of the flat screw 40.

In Step S30, a molten material is formed. The thermoplastic resin material is loaded into the material supply unit 20 and supplied into the melting unit 30 (see FIG. 1). As described above, melting of the thermoplastic resin material in the melting unit 30 is performed by heating by the heater 58 of the facing section 50 and rotation of the flat screw 40. As the flat screw 40 rotates, the thermoplastic resin material supplied from the material inlet ports 44 into the groove sections 42 is melt while being heated by heat of the heater 58, and converted into a molten material.

In Step S40, the molten material is distributed into the first flow path 65 of the feeding unit 60. The molten material is distributed into the center portion 46 via the groove sections 42 of the flat screw 40 (see FIG. 2). The molten material which has flowed into the center portion is guided to the communication hole 56 by the guide grooves 54 of the melting unit 30 (see FIG. 3). The molten material is supplied from the communication hole 56 into the first flow path 65 of the feeding unit 60 and distributed in the first flow path 65.

In Step S50, a composite material of the molten material and the fiber material is formed. As described above, in the first embodiment, the first introduction unit 74 is provided on the inner wall of the first flow path 65. The fiber 72 is fed out by the fiber winding section 78, and introduced from the first introduction unit 74 into the first flow path 65 via the introduction path 76. As the fiber 72 introduced into the first flow path 65 is mixed with the molten material distributed in the first flow path 65, a composite material is formed.

Figure 5:
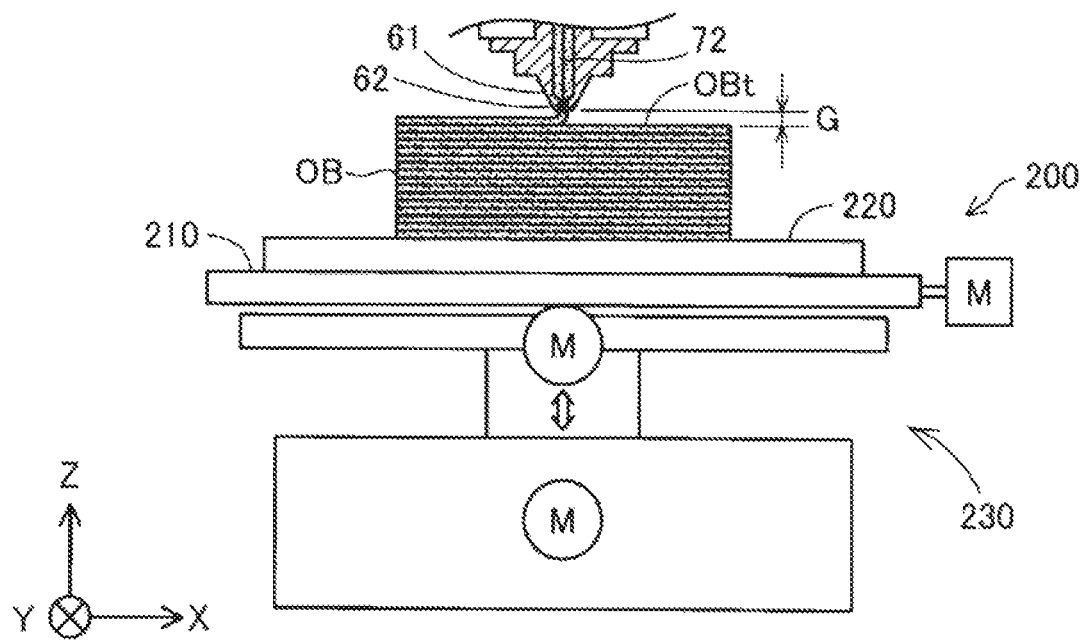
FIG. 5 is an explanatory view which illustrates a positional relationship between a three-dimensional model and a feeding port at the tip of a nozzle.

FIG. 5 is an explanatory view which illustrates a positional relationship between a three-dimensional object OB and the feeding port 62 at the tip of the nozzle 61. In the present embodiment, the molten material in which the fiber 72 is contained (hereinafter, referred to as a "composite material") is fed from the feeding port 62 of the nozzle 61 onto the modeling base 220. FIG. 5 schematically illustrates that the three-dimensional object OB is being produced on the modeling stage 220. In FIG. 5, for ease of understanding of the technical principle, the fiber 72 contained in the molten material fed out from the nozzle 61 is not illustrated.

In the three-dimensional modeling apparatus 100, a gap G is formed between the feeding port 62 at the tip of the nozzle 61 and a top OBt of the three-dimensional object OB which is being produced. The term "top OBt of the three-dimensional object OB" as used herein refers to an expected position where a molten material fed from the nozzle 61 is deposited near immediately under the nozzle 61.

The size of the gap G is preferably not less than the hole diameter Dn (see FIG. 1) at the feeding port 62 of the nozzle 61, and is preferably 0.7 times or more of the hole diameter Dn. Accordingly, a molten material fed from the nozzle 61 is deposited on the top OBt of the three-dimensional object OB without being tightly pressed against the top OBt of the three-dimensional object OB which is being produced. As a result, the horizontal cross-sectional shape of the molten material fed from the nozzle 61 is prevented from being collapsed, thereby reducing surface-roughness of the three-dimensional object OB. Further, in the configuration in which a heater is provided around the feeding port 62, the gap G can prevent superheating of a material by the heater, thereby reducing discoloration or degradation by superheating of the material deposited on the three-dimensional object OB.

Moreover, the size of the gap G is preferably not more than 1.5 times of the hole diameter Dn, and more specifically not more than 1.3 times of the hole diameter Dn. This prevents reduction in precision for an expected position where a molten material is deposited and reduction in adhesiveness of a molten material to the top OBt of the three-dimensional object OB which is being produced.

Figure 6:
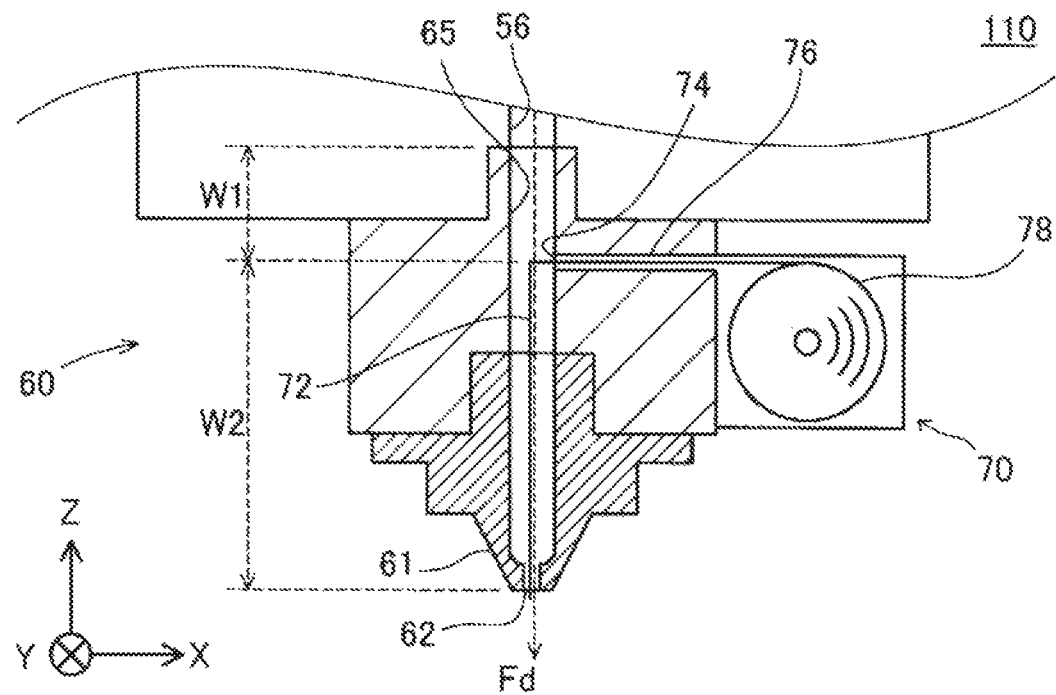
FIG. 6 is a schematic cross-sectional view of the molten material supplying apparatus which includes a feeding unit and a fiber supplying unit.

FIG. 6 is a schematic cross-sectional view of the molten material supplying apparatus 110 which includes a feeding unit 60 and a fiber supplying unit 70. The feeding unit 60 includes the nozzle 61 and a first flow path 65. As described above, the fiber 72 is fed out by rotation of the roll-shaped fiber winding section 78, and introduced from the first introduction unit 74 into the first flow path 65 via the introduction path 76. FIG. 6 schematically shows a distribution direction Fd of the molten material distributed in the first flow path 65. The fiber 72 introduced into the first flow path 65 is fed out from the feeding port 62 of the nozzle 61 along a flow of the molten material in the first flow path 65, flowing in the distribution direction Fd, together with the molten material. Further, FIG. 6 schematically illustrates that the fiber 72 is fed from the feeding port 62 of the nozzle 61.

The first introduction unit 74 is provided on the inner wall of the first flow path 65. An area of the outer shape of the first introduction unit 74 at a position where the first introduction unit 74 and the first flow path 65 is connected to each other, which is an area A1, is smaller than an area of the outer shape of the first flow path 65 in a direction perpendicular to a flow path of the molten material, which is an area A2. In the first embodiment, A1 has an area of not more than 5% of A2. Accordingly, the molten material distributed in the first flow path 65 can be prevented from flowing back into the introduction path 76 through the first introduction unit 74 (that is, the molten material is prevented from flowing back into the introduction path 76).

When the molten material is distributed in the first flow path 65, the molten material having viscosity has friction against a wall surface of the first flow path 65. Accordingly, the distribution speed of the molten material varies toward downstream in the first flow path 65. Specifically, the distribution speed of the molten material in the first flow path 65 is higher at the center position in a cross-section of the first flow path 65 in a direction perpendicular to the distribution direction Fd of the molten material (that is, center axis of the flow path of the first flow path 65) toward downstream in the first flow path 65. That is, the flow rate of the molten material is higher at the position close to the center in the first flow path 65 compared to the position outside the center axis. Accordingly, the composite material with the fiber 72 contained in the molten material being disposed adjacent to the center of the molten material can be provided by drawing the fiber 72 into the center of the flow where the flow rate is high.

FIG. 6 schematically illustrates a length W1 of the first flow path 65, which extends from a position where the first introduction unit 74 is connected to the first flow path 65 up to the communication hole 56, and a length W2 of the first flow path 65, which extends from a position where the first introduction unit 74 is connected to the first flow path 65 up to the feeding port 62, which is an opening of the nozzle 61. Further, in description of the lengths W1 and W2, the term "position where the first introduction unit is connected to the first flow path 65" as used herein refers a center position in the opening of the first introduction unit 74 which is connected to the first flow path 65, and the term "length of the first flow path 65 up to the communication hole 56" refers to the length of the first flow path 65 up to the position where the communication hole 56 is connected to the first flow path 65.

In the first embodiment, the length W1 of the first flow path 65, which extends between the position where the first introduction unit 74 is connected to the first flow path 65 and the communication hole 56, is smaller than the length W2 of the first flow path 65, which extends between the position where the first introduction unit 74 is connected to the first flow path 65 and the feeding port 62, which is an opening of the nozzle 61. That is, the first introduction unit 74 is disposed in the first flow path 65 at a position closer to the communication hole 56 than to the feeding port 62 of the nozzle 61 (that is, on the upstream side in the first flow path 65). Accordingly, the fiber 72 can be introduced from the upstream side of the first flow path 65. Therefore, compared with the case where the fiber 72 is introduced from the position close to the nozzle 61 (that is, the downstream side) of the first flow path 65, the fiber 72 can be mixed with the molten material by allowing the fiber 72 to follow a flow of the molten material in the first flow path 65.

B. Second Embodiment

Figure 7:
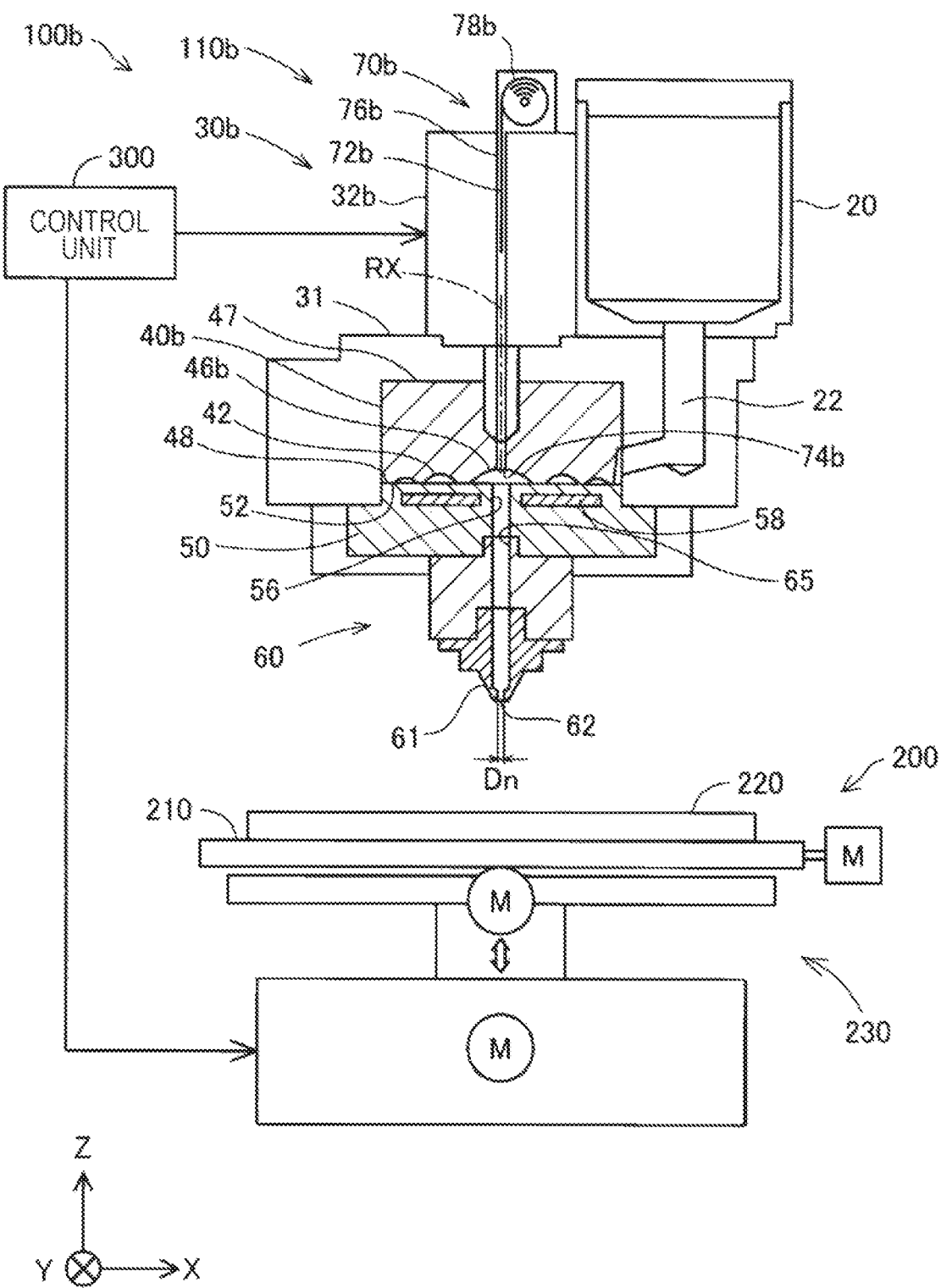
FIG. 7 is a schematic view which illustrates a configuration of a molten material supplying apparatus included in a three-dimensional modeling apparatus according to a second embodiment.

FIG. 7 is a schematic view which illustrates a configuration of a molten material supplying apparatus 110b included in a three-dimensional modeling apparatus 100b according to a second embodiment. The three-dimensional modeling apparatus 100b of the second embodiment has the same configuration as the molten material supplying apparatus 110 of the first embodiment except that the second embodiment has a molten material supplying apparatus 110b, while the first embodiment has the molten material supplying apparatus 110.

The molten material supplying apparatus 110b includes a melting unit 30b having a drive motor 32b and a flat screw 40b, and a fiber supplying unit 70b. Other configurations of the molten material supplying apparatus 110b and the melting unit 30b are the same as those of the molten material supplying apparatus 110 and the melting unit 30 of the first embodiment.

In the second embodiment, the fiber supplying unit 70b is provided in the Z direction of the drive motor 32b. The fiber supplying unit 70b includes a first introduction unit 74b, an introduction path 76b, and a fiber winding section 78b. The fiber winding section 78b is a roll around which the fiber 72b is wound in a cylindrical shape. The first introduction unit 74b is an opening for introducing the fiber 72b into the flow path for the molten material. In the second embodiment, the first introduction unit 74b is disposed at a center portion 46b of the groove section 42b of the flat screw 40b.

The introduction path 76b is a through hole in a substantially cylindrical shape provided in the drive motor 32b and the flat screw 40b so as to extend in the gravitational direction. In the second embodiment, the center axis of the introduction path 76b corresponds to the rotation axis RX of the flat screw 40b. The introduction path 76b communicates with the first introduction unit 74b such that a space in which the fiber winding section 78b is provided is connected to the center portion 46b of the flat screw 40b. That is, the introduction path 76b is a path for the fiber 72b that allows the fiber 72b to be introduced from the fiber winding section 78b into the center portion 46b of the flat screw 40b.

The fiber 72b is fed out by rotation of the roll-shaped fiber winding section 78b, and introduced from the first introduction unit 74b into the center portion 46b of the groove section 42b via the introduction path 76b, which is a through hole of the flat screw 40b. That is, the first introduction unit 74b can introduce the fiber 72b into the molten material that is distributed in the groove section 42b of the flat screw 40b. The fiber 72b which has been introduced into the center portion 46b is introduced into to the communication hole 56 provided at the center of the facing section 50 and then into the feeding unit 60 along a flow of the molten material in the flat screw 40b.

As described above, according to the molten material supplying apparatus 110b of the second embodiment, the fiber 72b can be introduced from the communication hole 56 provided in the facing section 50 into the first flow path 65. That is, the fiber 72b can be introduced from the upstream position relative to the first flow path 65. Accordingly, the position of the fiber 72 contained in the molten material can be prevented from being deviated from the center axis of the flow path in which the molten material is distributed.

C. Third Embodiment

Figure 8:
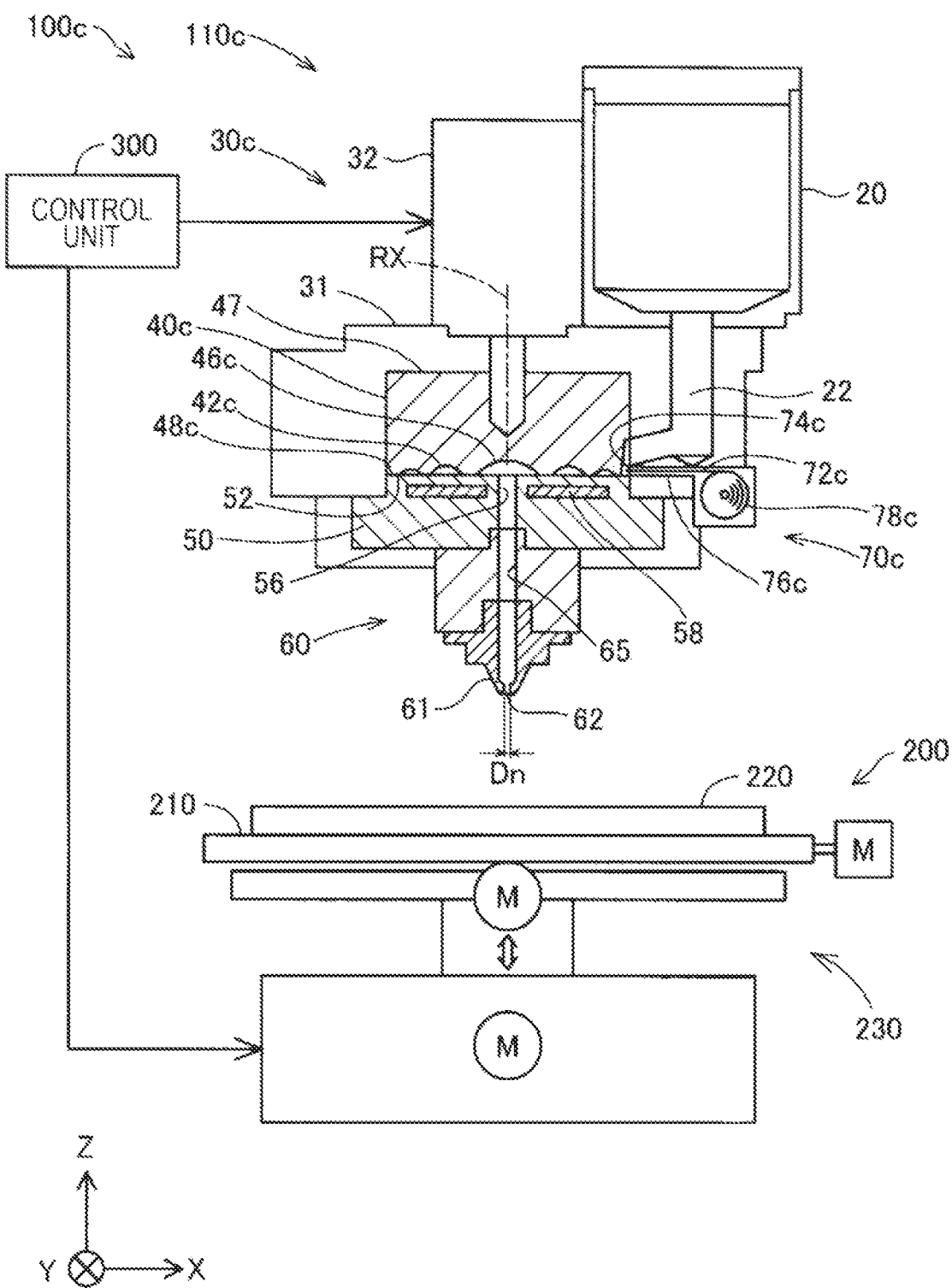
FIG. 8 is a schematic view which illustrates a configuration of a molten material supplying apparatus included in a three-dimensional modeling apparatus according to a third embodiment.

FIG. 8 is a schematic view which illustrates a configuration of a molten material supplying apparatus 110c included in a three-dimensional modeling apparatus 100c according to a third embodiment. The three-dimensional modeling apparatus 100c of the third embodiment has the same configuration as the molten material supplying apparatus 110 of the first embodiment except that the third embodiment has a molten material supplying apparatus 110c, while the first embodiment has the molten material supplying apparatus 110.

The molten material supplying apparatus 110c includes a melting unit 30c having a flat screw 40c, and a fiber supplying unit 70c. Other configurations of the molten material supplying apparatus 110c and the melting unit 30c are the same as those of the molten material supplying apparatus 110 and the melting unit 30 of the first embodiment.

In the third embodiment, the fiber supplying unit 70c is provided on the side surface which is perpendicular to the axial direction of the flat screw 40c. The fiber supplying unit 70c includes a first introduction unit 74c, and an introduction path 76c, and a fiber winding section 78c. The first introduction unit 74c is an opening for introducing the fiber 72c into the flow path for the molten material in the flat screw 40c. The first introduction unit 74c is disposed at a position connected to the material inlet port 44c on one of both ends of the groove section 42c of the flat screw 40b, which is opposite to the end connected to the communication hole 56. The fiber winding section 78c is a roll around which the fiber 72c is wound in a cylindrical shape.

The introduction path 76c is a path for the fiber 72c that allows the fiber 72c to be introduced from the fiber winding section 78c into the material inlet port 44c of the flat screw 40c. The fiber 72c is fed out by rotation of the roll-shaped fiber winding section 78c, and introduced from the first introduction unit 74c into the groove section 42c of the flat screw 40c via the introduction path 76c.

Figure 9:
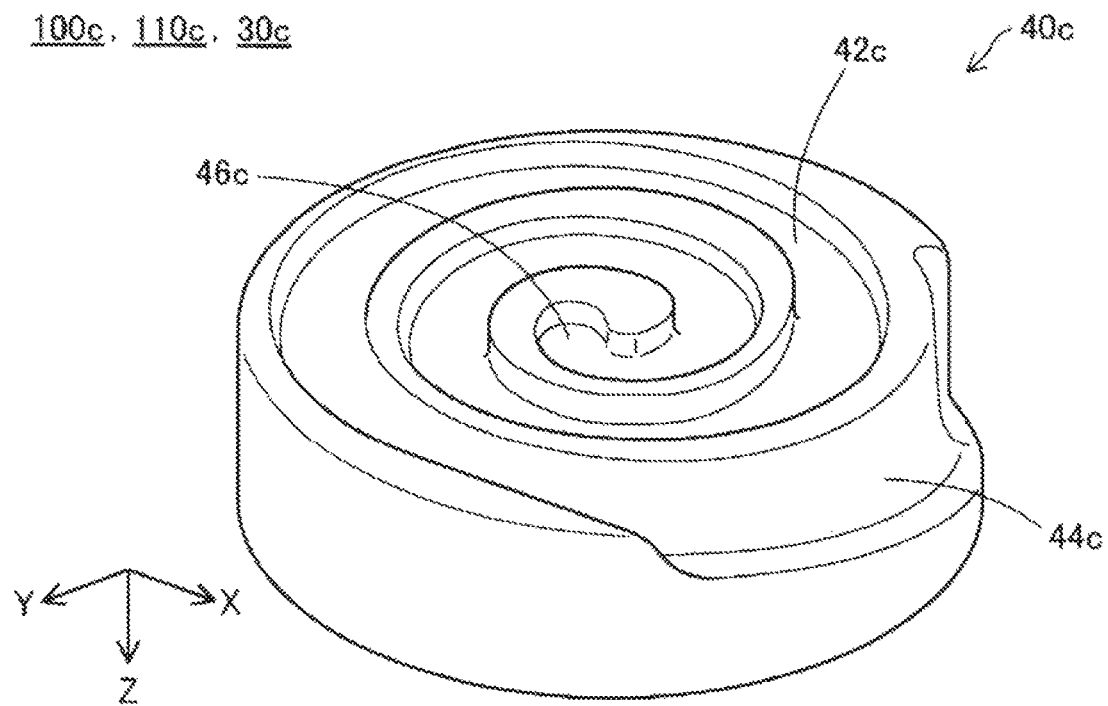
FIG. 9 is a perspective view of a flat screw in the third embodiment.

FIG. 9 is a perspective view of a flat screw 40c in the third embodiment. The flat screw 40c of the third embodiment includes only one groove section 42c. Accordingly, only one material inlet port 44c is provided. The fiber 72c is continuously introduced into the flat screw 40b through the material inlet port 44c when the first introduction unit 74c is connected to the material inlet port 44c. The fiber 72c reaches the center portion 46c along a flow of the molten material in the flat screw 40c, and is introduced into the communication hole 56 provided at the center of the facing section 50 and then into the feeding unit 60. The fiber 72c may be cut off by a predetermined length by using a cutting unit (not shown in the figure) after being introduced from the first introduction unit 74c into the material inlet port 44c.

As described above, according to the molten material supplying apparatus 110c of the third embodiment, the fiber 72c can be introduced from the communication hole 56 provided in the facing section 50 into the first flow path 65 via the space between the flat screw 40c and the facing section 50. Accordingly, the fiber 72c can be introduced from the upstream position relative to the first flow path 65 by a simple method compared to the second embodiment. Accordingly, the position of the fiber 72c contained in the resin material can be prevented from being deviated from the center axis of the flow path in which the molten material is distributed.

D. Fourth Embodiment

Figure 10:
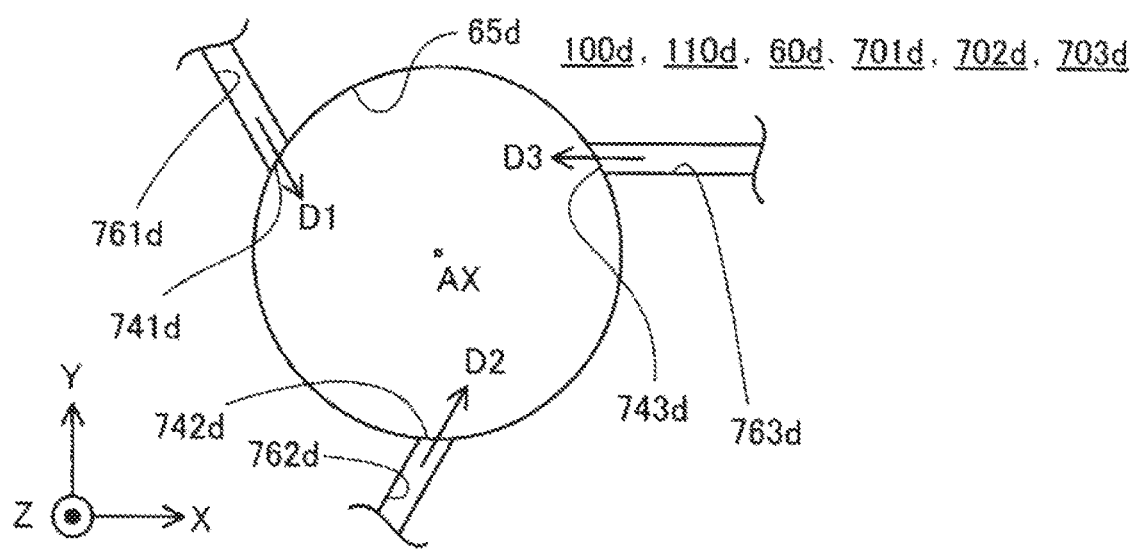
FIG. 10 is a schematic view which illustrates a configuration of a molten material supplying apparatus included in a three-dimensional modeling apparatus according to a fourth embodiment.

FIG. 10 is a schematic view which illustrates a configuration of a molten material supplying apparatus 110d included in a three-dimensional modeling apparatus 100d according to a fourth embodiment. The three-dimensional modeling apparatus 100d of the fourth embodiment has the same configuration as the molten material supplying apparatus 110 of the first embodiment except that the fourth embodiment has a molten material supplying apparatus 110d, while the first embodiment has the molten material supplying apparatus 110.

The molten material supplying apparatus 110d of the fourth embodiment includes a feeding unit 60d having a first flow path 65d, a first fiber supplying unit 701d, a second fiber supplying unit 702d, and a third fiber supplying unit 703d. The first fiber supplying unit 701d includes a first introduction unit 741d, an introduction path 761d, and a fiber winding section 781d (not shown in FIG. 10). The second fiber supplying unit 702d includes a second introduction unit 742d, an introduction path 762d, and a fiber winding section 782d (not shown in FIG. 10). The third fiber supplying unit 703d includes a third introduction unit 743d, an introduction path 763d, a fiber winding section 783d (not shown in FIG. 10). Other configurations of the molten material supplying apparatus 110d and the feeding unit 60d are the same as those of the molten material supplying apparatus 110 and the feeding unit 60 of the first embodiment.

The first introduction unit 741d is an opening for introducing the fiber 721d (not shown in FIG. 10) into the flow path for the molten material. The first introduction unit 741d is provided on the inner wall of the first flow path 65d. The fiber 721d is fed out from the fiber winding section 781d into the introduction path 761d, and introduced into the first flow path 65d through the first introduction unit 741d.

The second introduction unit 742d is an opening for introducing the fiber 722d (not shown in FIG. 10) into the flow path for the molten material. The second introduction unit 742d is provided on the inner wall of the first flow path 65d. The fiber 722d is fed out from the fiber winding section 782d into the introduction path 762d, and introduced into the first flow path 65d through the second introduction unit 742d.

The third introduction unit 743d is an opening for introducing the fiber 723d (not shown in FIG. 10) into the flow path for the molten material. The third introduction unit 743d is provided on the inner wall of the first flow path 65d. The fiber 723d is fed out from the fiber winding section 783d into the introduction path 763d, and introduced into the first flow path 65d through the third introduction unit 743d.

In the fourth embodiment, the first introduction unit 741d, the second introduction unit 742d and the third introduction unit 743d are disposed on the inner wall of the first flow path 65d at positions where one plane perpendicular to the flow path direction of the first flow path 65d intersects with the inner wall of the first flow path 65d. Among the above positions, FIG. 10 illustrates the first introduction unit 741d, the second introduction unit 742d, and the third introduction unit 743d disposed at positions equally spaced from each other.

In addition to the above components, FIG. 10 schematically illustrates a center axis AX of the flow path for the molten material in the first flow path 65d, a direction D1 in which the fiber 721d is introduced, a direction D2 in which the fiber 722d is introduced, and a direction D3 in which the fiber 723d is introduced. The first introduction unit 741d is configured to introduce the fiber 721d in the direction D1, which is the rightward direction with respect to the direction which is directed from the first introduction unit 741d to the center axis AX of the first flow path 65d when the direction of the flow path of the first flow path 65d is oriented parallel to the downward direction in the gravitational direction. The second introduction unit 742d, as with the first introduction unit 741d, is configured to introduce the fiber 722d in the direction D2, which is the rightward direction with respect to the direction which is directed from the second introduction unit 742d to the center axis AX of the first flow path 65d. The third introduction unit 743d is also configured to introduce the fiber 723d in the direction D3, which is the rightward direction with respect to the direction which is directed from the third introduction unit 743d to the center axis AX of the first flow path 65d.

Accordingly, the fiber 721d, the fiber 722d and the fiber 723d can be introduced into the first flow path 65d in the directions D1, D2 and D3, which are deviated to the right relative to the center axis AX of the first flow path 65d as viewed from the first introduction unit 741d, the second introduction unit 742d and the third introduction unit 743d, respectively.

According to the molten material supplying apparatus 110d of the fourth embodiment, a plurality of fiber materials (fibers 721d, 722d, and 723d) can be introduced into the first flow path 65d from different positions (the first introduction unit 741d, the second introduction unit 742d, and the third introduction unit 743d). Further, the fiber materials can be introduced in the right direction, which is one of the right and left directions, and the introduction directions (directions D1, D2, and D3) of the fiber materials at the respective positions where the fiber materials are introduced may be identical. Accordingly, the fiber material can be disposed to surround the center axis of the resin material. Therefore, compared to the case where a plurality of fiber materials are not contained, a composite material having improved strength can be provided.

In the fourth embodiment, in Step S50 of forming a composite material (see FIG. 4) in the method for producing a composite material for a three-dimensional model, a step of introducing the fiber material includes a step of introducing the fiber 721d from the first introduction unit 741d into the first flow path 65d, a step of introducing the fiber 722d from the second introduction unit 742d into the first flow path 65d, and a step of introducing the fiber 723d from the third introduction unit 743d into the first flow path 65d.

The step of introducing the fiber 721d from the first introduction unit 741d is a step of introducing the fiber 721d in the rightward direction with respect to the direction which is directed from the first introduction unit 741d to the center axis AX of the first flow path 65d when the direction of the flow path of the first flow path 65d is oriented parallel to the downward direction in the gravitational direction. The step of introducing the fiber 722d from the second introduction unit 742d is a step of introducing the fiber 722d in the rightward direction with respect to the direction which is directed from the second introduction unit 742d to the center axis AX of the first flow path 65d, as with the case where the fiber 721d is introduced from the first introduction unit 741d, when the direction of the flow path of the first flow path 65d is oriented parallel to the downward direction in the gravitational direction. The step of introducing the fiber 723d from the third introduction unit 743d is a step of introducing the fiber 723d in the rightward direction with respect to the direction which is directed from the third introduction unit 743d to the center axis AX of the first flow path 65d, as with the case where the fiber 721d is introduced from the first introduction unit 741d, when the direction of the flow path of the first flow path 65d is oriented parallel to the downward direction in the gravitational direction.

E. Other Embodiments

E1. Other Embodiment 1

(1) In the above embodiments, the first introduction unit 74 is disposed only at a position close to the communication hole 56 in the first flow path 65 (that is, on the upstream side of the first flow path 65). However, it is also possible that an introduction unit is disposed, for example, on the upstream side, the downstream side, and at the center of the first flow path (a plurality of introduction units are disposed in a flow path direction of the first flow path). In this case, a position from which the fiber is loaded can be modified, for example, depending on the distribution speed of the molten material distributed in the first flow path and characteristics of the raw material for the molten material.

(2) In the above embodiments, the introduction path is a space having a substantially cylindrical shape extending in a direction substantially vertical to the direction of a flow path of the first flow path 65. However, the introduction path may be a space extending in a direction other than that substantially vertical to the direction of a flow path of the first flow path. In this case, the introduction path may be a space extending at an angle, for example, 45 degrees to the direction of the flow path of the first flow path so that the fiber can be introduced at a predetermined angle to the distribution direction of the molten material.

(3) In the molten material supplying apparatus 110 of the above embodiment, a cutting mechanism for cutting the fiber 72 may also be provided. The cutting mechanism may be provided, for example, in the introduction path of the fiber supplying unit so that the fiber before being introduced into the flow path for the molten material is cut, or may be provided around the feeding port of the nozzle so that the composite material of the fiber and the molten material fed out from the nozzle can be cut.

(4) In the molten material supplying apparatus 110 of the above embodiment, the first introduction unit 74 is provided on the inner wall of the first flow path 65. However, the introduction unit may be connected to any position in the flow path in which the molten material is distributed, and may be provided, for example, on the inner wall of the communication hole of the facing section.

(5) In the molten material supplying apparatus 110 of the above embodiment, the first flow path 65 is formed in a straight shape along the gravitational direction, and the cross-sectional shape in the direction perpendicular to the distribution direction of the molten material in the first flow path 65 is a space of a substantially cylindrical shape with a diameter Wd. However, the first flow path may be a space of a shape with a diameter gradually decreasing from upstream to downstream in the flow path for the molten material.

(6) In the molten material supplying apparatus 110 of the above embodiment, a groove may be formed on the inner wall of the first flow path 65. In this case, a groove may be a spiral shape extending about a center axis, which is the center axis of the flow path of the first flow path.

(7) In the molten material supplying apparatus 110 of the above embodiment, the flat screw 40 includes three ridges 43 that form a side wall of three groove sections 42 and extend along the respective groove sections 42. However, the number of groove sections and ridges provided on the flat screw is not limited to three. The flat screw may have only one groove section, or two or more groove sections. Further, any number of ridges may be provided corresponding to the number of groove sections.

(8) In the molten material supplying apparatus 110 of the above embodiment, the material inlet ports 44 are provided at three positions on the flat screw 40. However, the number of the material inlet ports provided on the flat screw is not limited to three. The material inlet port may be disposed at only one position, or two or more positions on the flat screw.

(9) In the molten material supplying apparatus 110 of the above embodiment, an area of the outer shape of the first introduction unit 74 at a position where the first introduction unit 74 is connected to the first flow path 65, which is an area A1, is smaller than an area of the outer shape of the first flow path 65 in a direction perpendicular to a flow path of the molten material, which is an area A2. However, A1 may be larger than A2. In this case, it is preferred that the introduction unit is provided with, for example, a lid to thereby provide a mechanism for preventing the molten material from flowing from the introduction unit into the introduction path.

(10) In the method for producing a composite material for a three-dimensional model according to the above embodiments, the fiber 72 is introduced from the first introduction unit 74 provided on the inner wall of the first flow path 65 into the molten material in the step of forming a composite material. However, in the step of forming a composite material, the fiber material may be introduced from the introduction unit provided at least one of the communication hole and the first flow path.

(11) In the three-dimensional modeling apparatus 100 which includes the molten material supplying apparatus 110 of the above embodiments, the modeling stage section 200 moves the modeling base 220 in tri-axial direction by the movement mechanism 230 to change the relative position between the nozzle 61 of the molten material supplying apparatus 110 and the modeling base 220. However, the relative position between the nozzle and the modeling base can also be changed by a configuration other than the modeling stage section having a mechanism for moving in three axis directions, for example, by the molten material supplying apparatus having a mechanism for moving in the Z direction. The modeling stage section and a configuration other than the modeling stage section may each have a mechanism for moving in three-axis directions, or the movement mechanism of the modeling stage section and a configuration other than the modeling stage section may be combined to change the relative position between the nozzle and the modeling base.

E2. Other Embodiment 2

In the second embodiment, the fiber supplying unit 70b is provided in the Z direction of the drive motor 32b. The introduction path 76b is a through hole in a substantially cylindrical shape provided in the drive motor 32b and the flat screw 40b so as to extend in the gravitational direction. However, the fiber supplying unit may also be provided at a position other than the drive motor, for example, on the outer surface of the screw casing or the flat screw. In this case, the introduction path can be formed such that the introduction unit provided in the center portion of the flat screw and a space in which the fiber winding section is provided are connected to each other.

E3. Other Embodiment 3

In the molten material supplying apparatus 110c of the third embodiment, the flat screw 40c is provided with one groove section 42c and one material inlet port 44c. However, the number of groove section and material inlet port is not limited to one, and two or more groove sections and material inlet ports may also be provided.

E4. Other Embodiment 4

(1) In the molten material supplying apparatus 110d of the fourth embodiment, the first introduction unit 741d, the second introduction unit 742d and the third introduction unit 743d (that is, three introduction units) are provided. However, the introduction units are not limited to three, and two introduction units or four or more introduction units may also be provided.

(2) In the molten material supplying apparatus 110d of the fourth embodiment, the first introduction unit 741d is configured to introduce the fiber 721d in the direction D1, which is the rightward direction with respect to the direction which is directed from the first introduction unit 741d to the center axis AX of the first flow path 65d when the direction of the flow path of the first flow path 65d is oriented parallel to the downward direction in the gravitational direction. However, the first introduction unit may also be configured to introduce the fiber material in a direction forming an angle larger than 0 with respect to the direction directing to the center axis of the first flow path. In this case, the second introduction unit and the third introduction unit can be configured to introduce the fiber material in a direction forming the same angle as that of the above angle with respect to the direction directing to the center axis of the first flow path.

In this case as well, a plurality of fiber materials can be introduced from different positions into the first flow path while making the introduction directions identical, and the introduction directions may be one of the right and left directions. Accordingly, the fiber material can be disposed to surround the center axis of the resin material. Therefore, compared to the case where a plurality of fiber materials are not contained, a composite material having improved strength can be provided.

In addition, in the "direction forming an angle larger than 0 with respect to the direction directing to the center axis of the first flow path", the angular deviation from the "direction directing to the center axis of the first flow path" includes a direction component perpendicular to the center axis. In the "direction forming an angle larger than 0 with respect to the direction directing to the center axis of the first flow path", the angular deviation from the "direction directing to the center axis of the first flow path" may include a direction component horizontal to the center axis.

E5. Others

The present disclosure is not limited to the above embodiments, and can be embodied as various configurations without departing from the scope of the invention. For example, the technical features in the embodiments corresponding to the technical features in the examples described in the summary of the invention may be replaced or combined as appropriate in order to solve part or all the above problems or achieve part or all the above effects. Further, the technical features may be eliminated as appropriate unless they are described as being essential in the description.

What is claimed is:

1. A molten material supplying apparatus for use in a three-dimensional modeling apparatus, the molten material supplying apparatus comprising:
 a first introduction unit that introduces a fiber material;
 a melting unit that melts a thermoplastic resin into a molten material;
 a first flow path in which the molten material and the fiber material are distributed; and
 a nozzle that communicates with the first flow path to feed a composite material of the molten material and the fiber material, wherein the melting unit includes
- a facing section in which an axially extending communication hole communicating with the first flow path is formed, the facing section having a heater, and
- a flat screw which has a groove section at a position facing the facing section, the flat screw being rotated to melt the thermoplastic resin into the molten material and supply the molten material into the axially extending communication hole, wherein the first introduction unit is configured to connect to one of both ends of the groove section and is configured to introduce the fiber material in a radial direction toward the axially extending communication hole so as to allow the fiber material to be introduced into the groove section.

2. The molten material supplying apparatus according to claim 1, wherein
the first introduction unit is provided in the groove section,
the flat screw includes a through hole that communicates with the first introduction unit, and
the fiber material is introduced from the first introduction unit into the groove section via the through hole of the flat screw.

3. The molten material supplying apparatus according to claim 1, wherein the first introduction unit is connected to the first flow path.

4. The molten material supplying apparatus according to claim 3, wherein a length of the first flow path from a position where the first introduction unit is connected to the first flow path up to the communication hole is smaller than a length of the first flow path from the position where the first introduction unit is connected to the first flow path up to an opening of the nozzle.

5. The molten material supplying apparatus according to claim 3, further comprising a second introduction unit that introduces a fiber material, wherein
the first introduction unit is configured to introduce the fiber material in either rightward or leftward direction with respect to the direction which is directed from the first introduction unit to the center axis of the first flow path when the direction of the flow path of the first flow path is oriented parallel to a downward direction in a gravitational direction, and
the second introduction unit is configured to introduce the fiber material in either rightward or leftward direction with respect to the direction which is directed from the second introduction unit to the center axis when the direction of the flow path of the first flow path is oriented parallel to a downward direction in a gravitational direction.

6. The molten material supplying apparatus according to claim 1, wherein an area of an outer shape of the first introduction unit at a position where the first introduction unit and the first flow path is connected to each other is smaller than an area of an outer shape of the first flow path in a direction perpendicular to a flow path of the molten material.

7. A three-dimensional modeling apparatus comprising:
the molten material supplying apparatus according to claim 1;
a support section that receives the molten material and the fiber material fed out from the molten material supplying apparatus; and
a movement mechanism that changes a relative position between the molten material supplying apparatus and the support section.

8. A three-dimensional modeling apparatus comprising:
the molten material supplying apparatus according to claim 2;
a support section that receives the molten material and the fiber material fed out from the molten material supplying apparatus; and
a movement mechanism that changes a relative position between the molten material supplying apparatus and the support section.

9. A three-dimensional modeling apparatus comprising:
the molten material supplying apparatus according to claim 3;
a support section that receives the molten material and the fiber material fed out from the molten material supplying apparatus; and
a movement mechanism that changes a relative position between the molten material supplying apparatus and the support section.

10. A three-dimensional modeling apparatus comprising:
the molten material supplying apparatus according to claim 4;
a support section that receives the molten material and the fiber material fed out from the molten material supplying apparatus; and
a movement mechanism that changes a relative position between the molten material supplying apparatus and the support section.

11. A three-dimensional modeling apparatus comprising:
the molten material supplying apparatus according to claim 5;
a support section that receives the molten material and the fiber material fed out from the molten material supplying apparatus; and
a movement mechanism that changes a relative position between the molten material supplying apparatus and the support section.

12. A three-dimensional modeling apparatus comprising:
the molten material supplying apparatus according to claim 6;
a support section that receives the molten material and the fiber material fed out from the molten material supplying apparatus; and
a movement mechanism that changes a relative position between the molten material supplying apparatus and the support section.

* * * * *